UNITED STATES PATENT OFFICE.

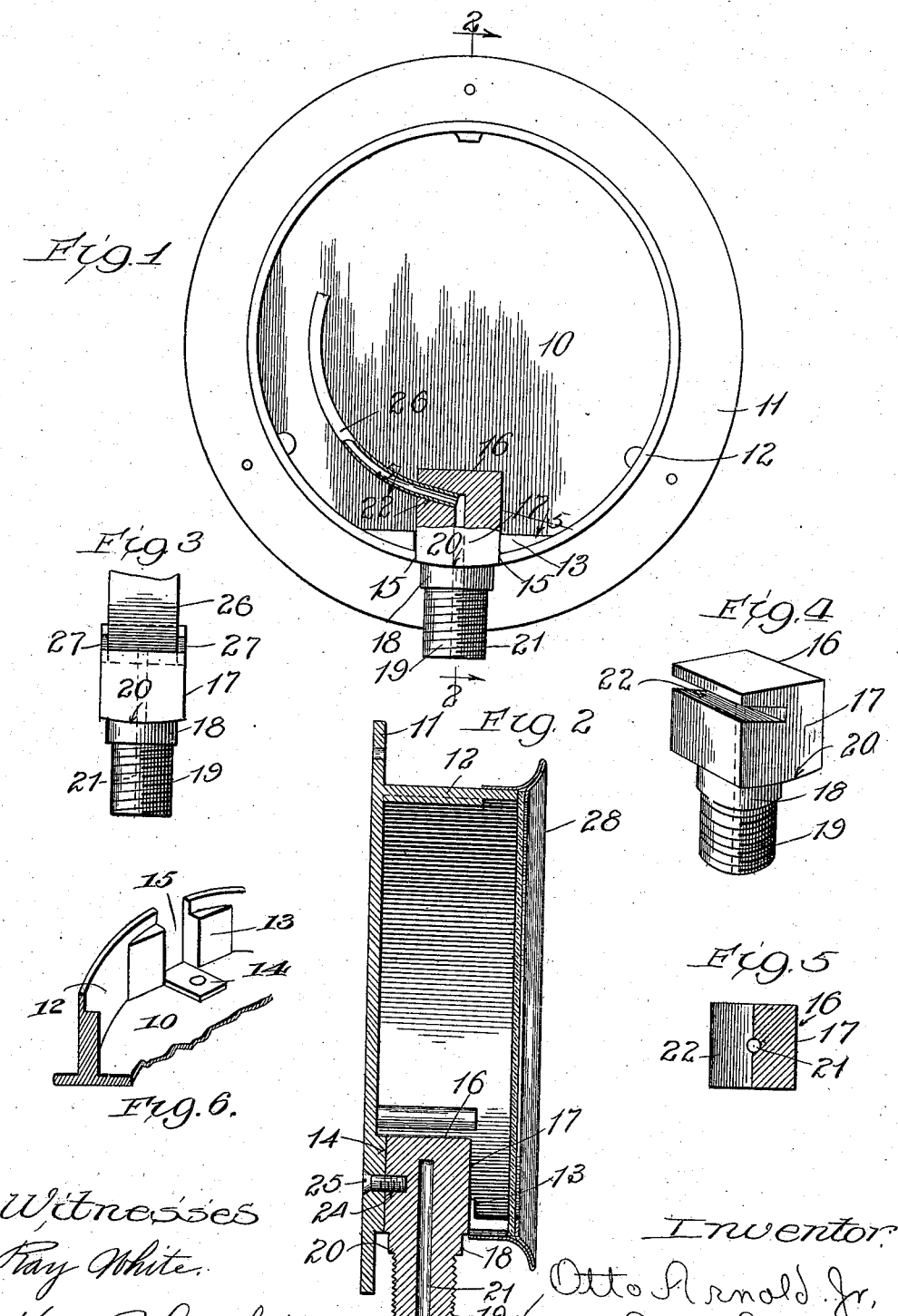

OTTO ARNOLD, JR., OF MAGDEBURG, BUCKAU, GERMANY.

PRESSURE-GAGE.

No. 881,764.	Specification of Letters Patent.	Patented March 10, 1908.

Application filed March 25, 1907. Serial No. 364,230.

*To all whom it may concern:*

Be it known that I, OTTO ARNOLD, Jr., a subject of the Emperor of Germany, residing at Magdeburg, Buckau, Germany, have invented certain new and useful Improvements in Pressure-Gages, of which the following is a specification.

My invention relates to improvements in Bourdon spring pressure gages, and has particular reference to the gage-tube-socket and its connection with the casing and gage tube.

The primary object of my invention is to provide a gage-tube socket, which may be made and combined with appropriate casing and tube members with advantage to the gage structure, and with lessened cost in the manufacture of the gage.

More specific objects of my invention will best become apparent to those skilled in the art from the following description thereof, taken in conjunction with the accompanying drawing, wherein is illustrated an operative embodiment of my invention.

In such drawing: Figure 1 is a plan view of the casing, gage socket and a fragment of the gage tube; Fig. 2 is a transverse section on line 2—2 of Fig. 1, showing the customary glass-holding ring in place. Fig. 3 is an elevation of the socket and spring tube from the left of Fig. 1. Fig. 4 is a perspective of the socket looking from the side to the left in Fig. 1, and; Fig. 5 is a section on line 5—5 of Fig. 1. Fig. 6 is a perspective view of a portion of the gage casing showing the thickened or reinforcing portions of the wall thereof.

Throughout the several figures like numerals of reference refer always to like parts.

In the drawing, 10 indicates the gage casing comprising a flat base 11 and an edge wall 12, which latter is provided with an internally thickened or reinforcing portion 13. Extending radially inward from the reinforcement 13 the casing is provided at its bottom with an elevated portion or platform 14. Through the reinforced portion of wall 12 is made a vertical opening 15 extending down to the level of the top surface of platform 14, the opposite walls of such slot being preferably parallel, straight planes, of a height greater than the width of opening 15.

16 indicates in general the tube socket which preferably comprises a substantially square head 17 each face of which is in width equal to the width of the opening of the slot 15 in the casing wall, and a stem 18 having its end screw-threaded as at 19. The shoulder formed at the juncture of the head 17 and stem 18 is preferably rounded as at 20 on an arc conforming with the outer curve of the wall 12, as indicated at 20.

21 indicates a duct leading axially through the screw threaded end of the socket to a point adjacent the remote end of its head, and 22 indicates a slot cut from one side surface of the head to and intersecting such duct 21. The slot 22 is preferably cut to make a slightly obtuse angle with the duct 21, and, as indicated in Fig. 4, it preferably does not completely traverse the diameter of duct 21, but only opens a side of such duct.

Into a face of the head 17, which is to rest on platform 14 of the casing is tapped a screw hole 24, and 25 indicates a screw taking through the platform 14 into the screw hole 24 of the socket.

26 indicates the Bourdon spring, having its heel extremity seated in the slot 22 abutting against the wall forming the inner end of the slot, and suitably retained in place therein as by a solder-body, indicated at 27.

28 indicates the glass retaining ring having the usual skirt for surrounding the edge of rim 12.

In the manufacture of the devices described the casing is preferably cast in a manner common in the art, with a slot through the thickened or reinforced portion 13 of the wall 12 roughly approximating the proper width, and then the casting is machined so that the proximate edges of the slot 15 shall be smooth and parallel, and the upper surface of the platform 14 flat and true.

The sockets 16 are preferably turned up out of square rod stock, each drilled to provide the duct 21 and milled to provide the slot 22, the construction being such that the sockets may be rapidly and uniformly made by automatic machinery so as to be interchangeable and to interfit exactly with the machined parts of the casings. Furthermore, it will be observed that the width and depth of the slot 22 milled in the head enables the juncture of the said slot with the duct 21 to be easily effected, thereby insuring a properly free opening between the tube-receiving slot and the duct through the stem, and preventing the spoiling of sockets, which is apt to occur where two drilled ducts have to be brought to intersection at a point in the interior of the socket.

In assembling the parts the tube 26 may be first applied to the socket, by inserting the heel end of the tube into the slot 22 in the socket so that its rear end abuts against the inclined end of the slot, and it will be observed that since the rear end of the slot 22 extends to only about the middle of the duct 21, free communication between said duct and the interior of the tube is not interfered with. The tube 26 is properly positioned so it lies between planes parallel with the bottom of the head, and for retaining the tube in place I prefer that it be sweated in with suitable solder, as indicated at 27. Then the assembled socket and tube may readily be inserted in the slot 15 in the thickened wall of the casing, to fit snugly therein with the curved shoulder 20 of the socket forming a continuation of the curvature of wall 12 of the casing, and the bottom of the socket head resting flat upon the platform 14. A single screw 25 may be employed to hold the socket in this position or two or more screws may be used if desired. When the glass-retaining ring 28 is applied its skirt overlies the upper edge of the socket and so gives a neat finish to the assembled structure, externally closing the free or open portion of the slot 15.

It will be observed that the coaction of the flat surfaces of the squared socket head and the platform 14 insures that the spring tube 26 shall lie in a plane in parallelism with the general plane of the bottom of the casing, and furthermore, that the vertical opening of the slot 15 enables the assembled spring and socket to be inserted on a line at right angles to the plane at the bottom of the casing, so that a spring tube 26 of any curvature practically within the limit of the casing may be inserted without distortion or bending, such as occurs when the socket stem must be inserted through a hole between the top and bottom edges of the casing wall. It will also be observed that since the connection between the casing and the socket is made through the bottom of the casing, which is flat, interchangeable parts may be employed on gages of different sizes. And further, the insured accuracy of connection between duct 21 and slot 22, enables me to use a very small duct with attendant advantages in that the time element introduced into the action by the reduction of size of the ducts makes the gage very steady-reading.

Thus it will be clear that my invention produces a gage construction which is simple, efficient, strong, and cheap of manufacture, both as far as the character of the work and the number and character of parts are concerned.

Having thus described my invention, what I claim and desire to secure by Letters Patent, of the United States, is:

1. In a pressure gage, the combination with a casing providing a base, and a peripheral wall having a thickened portion wherein is provided an opening extending from the edge of the wall toward the base, of a socket member providing a head of squared stock having side surfaces arranged to interfit intimately with the confronting surfaces of said opening in the wall, and means for securing the socket in such position.

2. The combination in a pressure gage, of a casing having a base and a peripheral wall having an opening therein from its edge toward the base, the edges of said opening constituting parallel planes, a square-headed socket member fitting snugly in said opening, and provided with a central bore and a transverse slot intersecting said bore and extending clear across the head, and a gage tube seated in said slot and closing the same on all sides of the duct aperture.

3. A socket member for gage tubes, comprising a head of squared stock and a reduced, screw threaded stem integral therewith, said stem being provided with an axial duct, and said head being provided with a slot extending from side to side thereof and intersecting said duct.

4. A socket member for gage tubes, comprising a head of squared stock and a reduced, screw threaded stem integral therewith, said stem being provided with an axial duct, and said head being provided with a slot extending from side to side thereof and intersecting said duct at an oblique angle.

5. In a pressure gage, a socket provided with a duct extending therein in one direction, and a transverse slot extending clear across the socket and intersecting said duct, combined with a gage tube seated in said slot, and closing the same on all sides of said intersection with the duct.

6. In a pressure gage, the combination of a socket having a duct extending longitudinally thereinto, and a slot extending clear across the socket and intersecting said duct, of a gage tube seated in said slot and having its end opening to said duct.

7. In a pressure gage, the combination with a socket having a longitudinal duct extending thereinto, and a transverse slot extending clear across the socket intersecting said duct and a gage tube secured in said slot having its end bottomed against the end of the slot and in open communication with the duct.

8. The combination with a casing comprising a base and a peripheral rim, having an opening therein adapted to receive a square member, of a square-headed socket interfitting in said opening in contact with the base, provided with an axial duct and a transverse slot extending clear across said head, intersecting said duct, and a gage tube fitted in said slot.

9. In a pressure gage, a casing providing a base having a platform 14, and a peripheral wall having a thickened portion adjacent said platform, and provided with an opening through said thickened portion, having straight parallel walls of a square-headed socket interfitting in said opening upon the flat surface of the platform 14, and a screw taking through the platform 14 into the square socket head.

In testimony whereof I hereunto set my hand in the presence of two witnesses.

OTTO ARNOLD, Jr.

In the presence of—
  R. C. A. FRAMMEGER,
  C. E. GEORGIE.